United States Patent [19]

Thornton

[11] 4,296,646
[45] Oct. 27, 1981

[54] AUTOMATIC TRANSMISSION

[75] Inventor: Kenneth Thornton, Nantwich, England

[73] Assignee: Rolls-Royce Motors Limited, Crewe, England

[21] Appl. No.: 967,150

[22] Filed: Dec. 6, 1978

[30] Foreign Application Priority Data

Jan. 5, 1978 [GB] United Kingdom ............... 00284/78

[51] Int. Cl.³ .................... F16H 47/08; F16H 47/00
[52] U.S. Cl. ................................ 74/688; 74/730; 74/762; 74/766
[58] Field of Search ............... 74/677, 763, 762, 766, 74/767, 688, 730

[56] References Cited

U.S. PATENT DOCUMENTS

| 2,736,407 | 2/1956 | Smirl | 74/688 X |
| 2,813,437 | 11/1957 | Kelbel et al. | 74/767 X |
| 2,821,869 | 2/1958 | Kelbel | 74/767 X |
| 2,844,975 | 7/1958 | Kelbel et al. | 74/767 X |
| 2,901,923 | 9/1959 | Waclawek | 74/767 X |
| 3,263,527 | 8/1966 | Stockton | 74/677 |
| 4,003,273 | 1/1977 | Miller | 74/766 X |

FOREIGN PATENT DOCUMENTS

| 747321 | 4/1956 | United Kingdom . |
| 799020 | 7/1958 | United Kingdom . |
| 1331048 | 9/1973 | United Kingdom . |

Primary Examiner—Lawrence J. Staab
Attorney, Agent, or Firm—Cushman, Darby & Cushman

[57] ABSTRACT

A multi-ratio motor car automatic transmission comprising two planetary gear trains and a coupling between input and output. Each train comprises a sunwheel, planet pinions, planet pinion carrier and internally toothed annulus. Two clutches and two or three friction reaction brakes hold stationary and/or prevent or allow various parts of the gear trains to rotate to select one of the ratios. The manner of selection is such as to reduce reliance of the transmission on the coupling so as to reduce losses in the coupling and thereby improve fuel consumption. Arrangements are described suitable for rear engined and transverse front engined vehicles as well as for the more conventional front engine layout.

2 Claims, 7 Drawing Figures

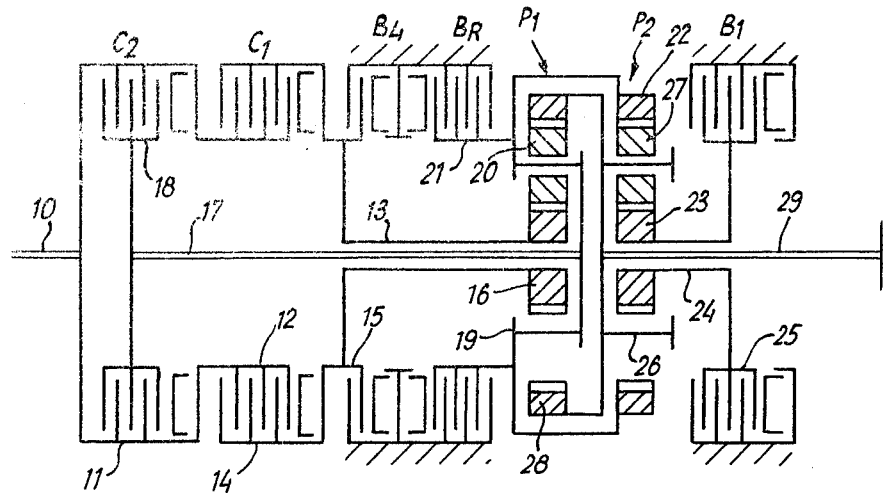
_FIG_1_
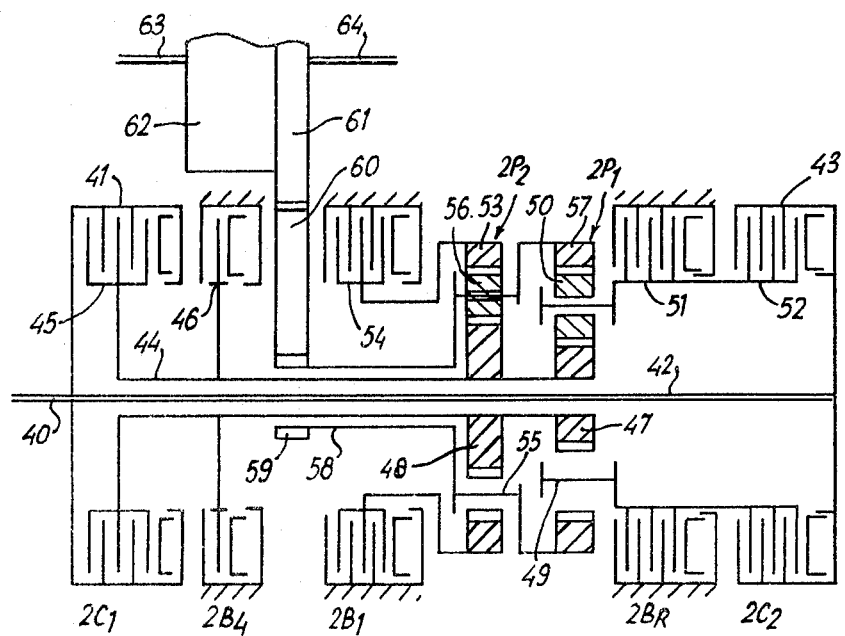
_FIG_2_

AUTOMATIC TRANSMISSION

The presently conventional automatic transmission for a motor car consists of a simple three element hydrodynamic torque converter driven by the engine and driving through an automatic gearbox providing three forward ratios and one reverse ratio by means of two planetary gear trains, two friction clutches and two friction brakes. The converter has a "free-wheeling" stator and functions as a fluid coupling in nearly all driving conditions.

Such transmissions have been very successful but have two shortcomings which are becoming important in the present search for improved fuel consumption.

They do not have a "cruising gear" or "overdrive" for modern highways.

The torque converter is not very efficient even in its usual fluid coupling role having losses of 3% to 5% in typical driving conditions. In an "overdrive" or equivalent ratio the engine and converter impeller speed would be lower and the engine torque would have to be higher to provide the same tractive effort at the tyres. Due to the inherent characteristics of torque converters and fluid couplings the reduced speed and the increased torque would both increase the losses.

According to the present invention, there is provided a transmission comprising an input and an output, planetary gearing disposed between the input and the output providing one reverse and three forward transmission ratios and a coupling associated with the gearing in which the gearing provides in association with first and second clutches and first and second reaction brakes first second third and fourth members, the first member being arranged to be driven from a prime mover through the coupling and the first clutch in reverse first and third ratios; the second member being arranged to be driven directly from the prime mover in second and third ratios and held stationary through the first reaction brake in reverse ratio; the third member is held stationary through the second reaction brake in first and second ratios and the fourth member is permanently connected to the output.

In order that the invention may be more clearly understood, four embodiments thereof will now be described by way of example with reference to the accompanying drawings, in which:

FIG. 1 shows a first form of an automatic transmission comprising two clutches and three reaction brakes.

FIG. 2 shows a second form of an automatic transmission which also comprises two clutches and three reaction brakes but which is arranged to be particularly suitable for front wheel drive vehicles with engines mounted transversely to the longitudinal axis of the vehicle.

Figure 2A:
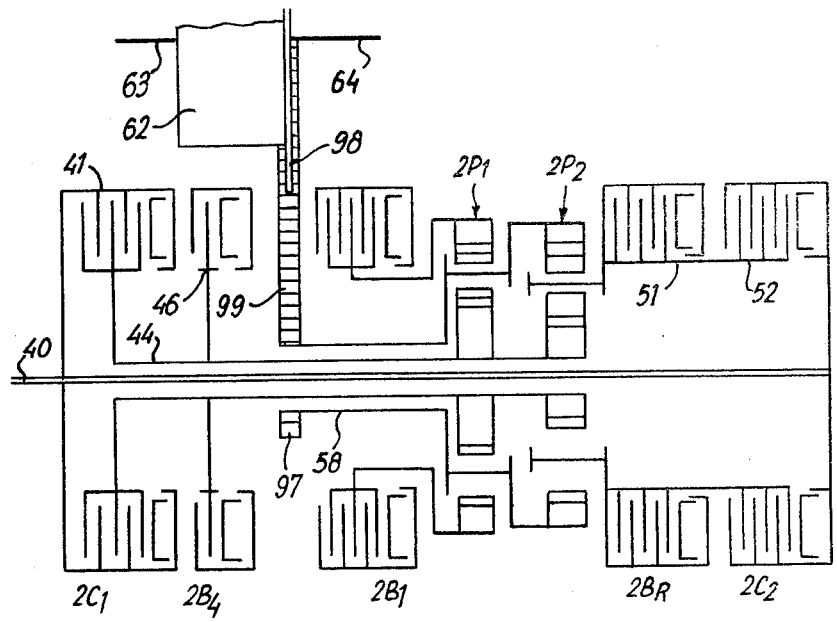
FIG. 2A shows a first modification of the arrangement of FIG. 2 comprising a different arrangement on the output side of the transmission.

Referring to FIG. 1, an automobile transmission is shown which comprises input and output shafts 10 and 29, two trains of planetary gears indicated generally by the reference $P_1$, $P_2$, first and second friction clutches $C_1$, and $C_2$ and first, second and third reaction brakes $B_1$, $B_4$ and $B_R$. The clutch $C_1$ comprises an inner hub and clutch plates 12 and an outer drum and clutch plates 14 and the clutch $C_2$ an inner hub and clutch plates 18 and an outer drum and clutch plates 11. The reaction brakes $B_1$, $B_4$ and $B_R$ respectively comprise hubs and clutch plates 25, 15 and 21 and outer clutch plates in each case engage a member secured to the casing. Each of the planetary gear trains comprises a sun wheel, planet pinions, planet pinion carrier and an internally toothed annulus.

In operation, the input shaft 10 drives the outer drum 11 of the clutch $C_2$ and the inner clutch plate hub 12 of the clutch $C_1$. The first member, as defined above, of the planetary gearing consists of a sleeve 13 attached to the outer drum 14 of the clutch $C_1$ the hub 15 of the reaction brake $B_4$ and the sun wheel 16 of the first planetary gear train. The second member consists of a shaft 17 attached to the hub 18 of the clutch $C_2$ and the carrier 19 of the planet pinions 20 of the first planetary train, to which is attached the hub 21 of the reaction brake $B_R$ and an internally toothed annulus 22 of the second planetary train. The third member consists of the sun wheel 23 of the rear planetary train connected by a sleeve 24 to the hub 25 of the reaction brake $B_1$. The fourth member consists of the carrier 26 of the planet pinions 27 of the rear planetary train connected to the internally toothed annulus 28 of the front planetary train and to the output shaft 29.

In the first forward transmission ratio, the clutch $C_1$ is engaged and the sun wheel 16 drives the planet pinion 20, the tooth loads driving the planet pinion carrier 19 and the attached annulus 22 forwards. This causes the planet pinions 27 to roll around the sun wheel 23, which is held stationary by the reaction brake $B_1$, and therefore the carrier 26, the output shaft 29 and the annulus 28 are driven forwards at a lower speed than annulus 22. The reduced speed of the annulus 28 causes the planet pinion carrier 19 and the annulus 22 to be driven at a lower speed than the sun wheel 16.

In the second forward transmission ratio, the clutch $C_2$ is engaged to drive the annulus 22 via the shaft 17 and the planet pinion carrier 19. The planet pinions 27 roll round the sun wheel 23 which is held stationary by the reaction brake $B_1$ causing the planet pinion carrier 26 and the output shaft 27 to be driven at reduced speed. In this second ratio the annulus 22 is driven at input shaft speed, whereas in the first ratio it is driven at a lower speed.

In the third forward transmission ratio, the clutches $C_1$ and $C_2$ are both engaged causing both the sun wheel 16 and the planet pinion carrier 19 together with the annulus 22 to rotate at the speed of the input shaft 10. The planet pinions 20 are thus enable to rotate about their own axes and the annulus 28, together with planet pinion carrier 26, and the output shaft 29 must also rotate at the speed of the input shaft 10 providing a 1:1 ratio. The clutch $C_2$ transmits a torque higher than the input torque and the clutch $C_1$ returns the excess to the input shaft. Because the annulus 22 and the carrier 26 both rotate at input shaft speed the sun wheel 23 must also rotate at input shaft speed and the gear trains rotate as a unit.

In the fourth forward transmission ratio, the clutch $C_2$ drives the planet pinion carrier 19 and the planet pinions 20 roll round the sun wheel 16 which is held stationary by the reaction brake $B_4$, causing the annulus 28 and the output shaft 29 to be driven at increased speed. The annulus 22 is driven at the speed of the input shaft and the planet pinion carrier 26 at the speed of the output shaft, causing the sun wheel 23 to rotate forwards, but transmit no power.

In the reverse transmission ratio, the clutch $C_1$ is engaged and the planet pinion carrier 19 is held stationary by the reaction brake $B_R$. The sun wheel 16 drives the planet pinion 20, which in turn drive the annulus 28 and the output shaft 29 at reduced speed in the reverse direction. Annulus 22, sun wheel 23 and planet pinions 27 are not loaded.

FIG. 2 shows an alternative arrangement to that of FIG. 1 suitable for front wheel drive cars with transvere engines. As with the first embodiment of FIG. 1, this embodiment comprises two clutches $2C_1$ and $2C_2$, three reaction brakes $2B_1$, $2B_4$ and $2B_R$ and two planetary gear trains $2P_1$ and $2P_2$. The clutch $2C_1$ comprises an inner hub and clutch plates 45 and outer drum and clutch plates 41 and the clutch $2C_2$ comprises an inner hub and clutch plates 52 and an outer drum and clutch plates 43. The reaction brakes $2B_1$, $2B_4$ and $2B_R$ respectively comprise hubs and clutch plates 54, 46 and 51 and outer clutch plates in each case engage a member secured to the casing. Each planetary gear train comprises a sun wheel, planet pinions planet pinion carriers and internally toothed annulus. An input shaft 40 drives the outer drum 41 of the clutch $2C_1$ and a shaft 42 drives the outer drum 43 of the clutch $2C_2$. The first member, as defined above, consists of a sleeve 44 attached to the hub 45 of the clutch $2C_1$, the hub 46 of the reaction brake $2B_4$ and the sun wheels 47 and 48 of the two planetary gear trains. The second member consists of the carrier 49 carrying the planet pinions 50 of the first planetary train and connected to the hub 51 of the reaction brake $2B_R$ and the hub 52 of the clutch $2C_2$. The third member consists of the internally toothed annulus 53 of the second planetary train connected to the hub 54 of the reaction brake $2B_1$. The fourth member consists of the carrier 55 of the planet pinions 56 of the second planetary train connected to the internally toothed annulus 57 of the first planetary train and to the sleeve 58 from which the drive is transmitted through spur gears 59, 60 and 61 to a differential 62 and thence through shafts 63 and 64 to the vehicle road wheels.

Figure 2B:
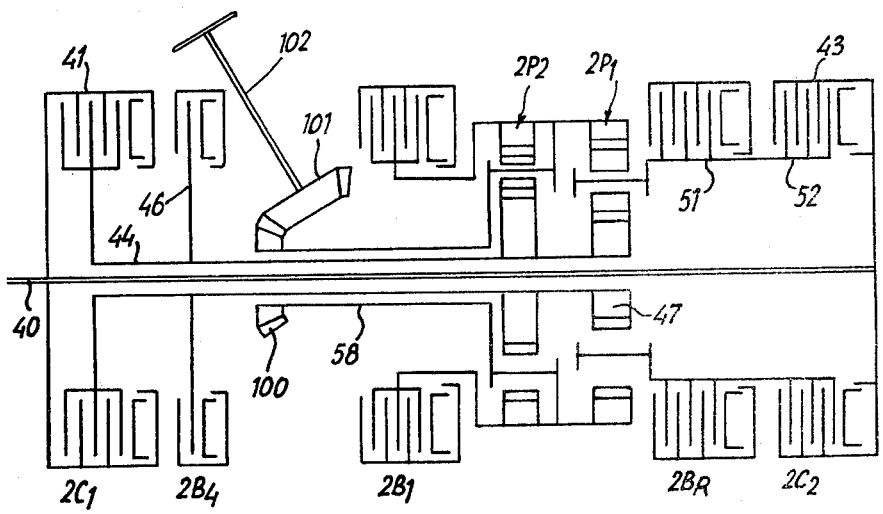
FIG. 2B shows a second modification of the arrangement of FIG. 2 comprising a further different arrangement on the output side of the transmission suitable for a rear engined vehicle.

Alternatively, as shown in FIG. 2A, the sleeve 58 could drive the differential 62 by means of a chain 99 running on sprockets 97 and 98, or in a rear engined public service vehicle the arrangement shown in FIG. 2B could be adopted. In the arrangement of FIG. 2B, the sleeve 58 carries a bevel gear 100 which meshes with a bevel gear 101 and drives a shaft 102 which is connected to the rear axle of the vehicle by a propeller shaft.

Figure 2C:
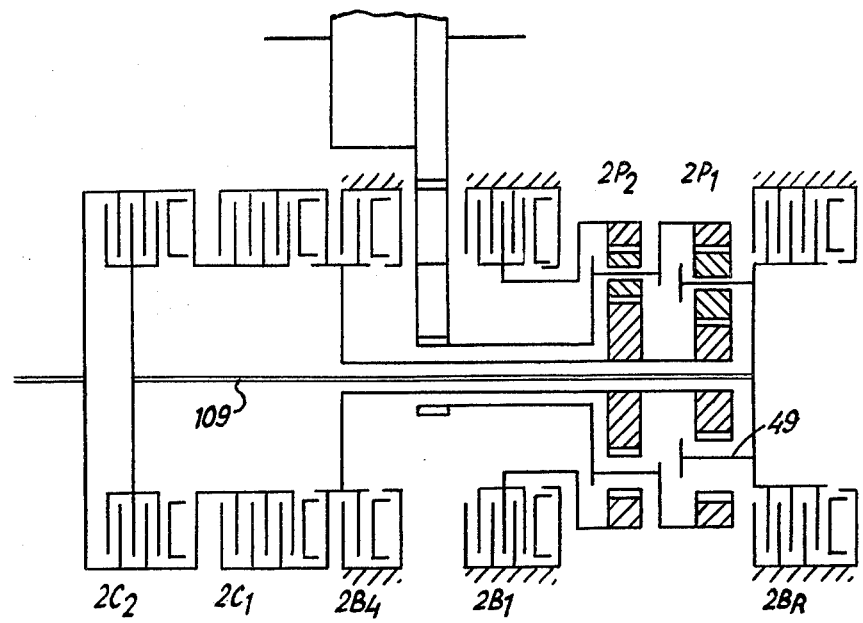
FIG. 2C shows a third modification of the arrangement of FIG. 2 comprising an alternative arrangement of the clutches.

A further variation would be to position the clutch $2C_2$ adjacent to clutch $2C_1$ as shown in FIG. 2C with its hub driving shaft 109 which would be connected directly to the planet carrier 49 of the first train. However, the arrangements shown in FIG. 2, 2A and 2B minimise the distance from the end of the engine to the plane of the transfer gears 59, 60 and 61 and enable the differential 62 to be positioned as near as possible to the centre line of the vehicle.

In the arrangement of FIG. 2 the various transmission ratios are achieved as follows.

First Ratio

The clutch $2C_1$ is engaged to drive the sun wheel 48 causing the planet pinions 56 to roll round the annulus 53, which is held stationary by the reaction brake $2B_1$, causing the planet pinion carrier 55 and the sleeve 58 to be driven at reduced speed. Sun wheel 47, pinion 50 and toothed annulus 57 are also driven but transmit no load.

Second Ratio

The clutch $2C_2$ is engaged to drive the planet pinion carrier 49. The planet pinions 50 drive both the annulus 57 together with the planet pinion carrier 55 and the sleeve 58, and the sun wheel 47 forwards. The planet pinions 56 roll round the annulus 53 which is held stationary by the reaction brake $2B_1$, causing the connected sun wheels 48 and 47 to rotate forwards at a higher speed than the planet pinion carrier 55 and the annulus 57. The speed of annulus 57 is therefore lower, and the speed of sun wheels 47 and 48 is higher than the speed of the input shaft of the planet pinion carrier 49. The sleeve 58 therefore rotates forwards at reduced speed, but at a higher speed than in First Ratio, in which the sun wheels 47 and 48 rotate at the speed of the input shaft 40.

Third Ratio

The clutch $2C_2$ is engaged to drive the planet pinion carrier 49. The planet pinions 50 drive both the sun wheel 47 and the annulus 57 forward, but the clutch $2C_1$ is also engaged, constraining the sun wheel 47 to rotate at the speed of the input shaft 40. The annulus 57, together with the planet pinion carrier 55 and the sleeve 58, and also the sun wheel 48 and therefore annulus 53 must also rotate at the speed of the input shaft 40 and the gear trains rotate as a unit providing a 1:1 ratio. The clutch $2C_2$ transmits a torque higher than the input torque and the clutch $2C_1$ returns the excess torque to the input shaft 40.

Fourth Ratio

The clutch $2C_2$ is engaged to drive the planet pinion carrier 49. The planet pinions 50 roll round the sun wheel 47 which is held stationary by the reaction brake $2B_4$ causing the annulus 57, the planet carrier 55 and the sleeve 58 to be driven forward at increased speed. The pinions 56 roll round the stationary sun wheel 48, causing the annulus 53 to rotate forward, but transmit no power.

Reverse Ratio

The clutch $2C_1$ is engaged to drive the sun wheel 47. The planet pinion carrier 49 is held stationary by the reaction brake $2B_R$ and the annulus 57 and the sleeve 58 are driven at reduced speed in the reverse direction. Sun wheel 48, annulus 53 and pinion 56 are not loaded.

Figure 3:
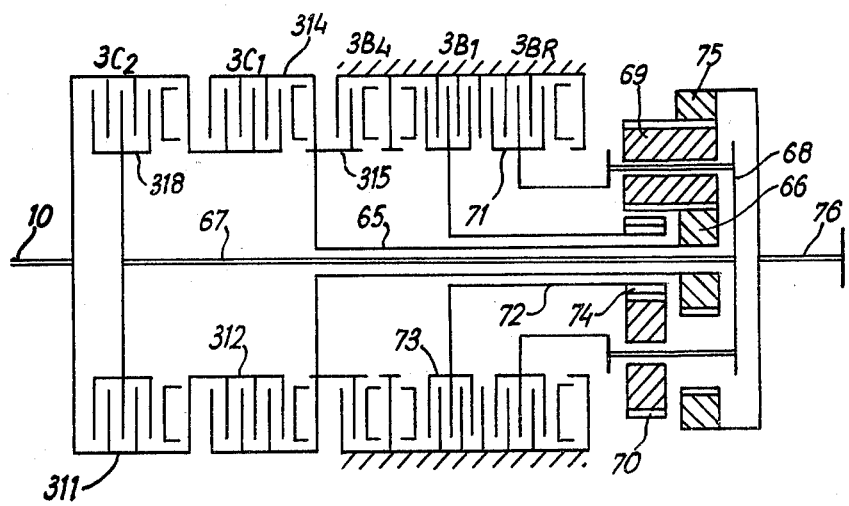
FIG. 3 shows an alternative form of automatic transmission to that of FIGS. 1 and 2 also comprising two clutches and three brakes but incorporating a different gear train.

FIG. 3 shows another alternative gear train. There are again provided two clutches $3C_1$ and $3C_2$, three reaction brakes $3B_1$, $3B_4$ and $3B_R$ and two planetary gear trains. The clutch $3C_1$ comprises an inner hub and clutch plates 312 and outer drum and clutch plates 314 and the clutch $3C_2$ and inner hub and clutch plates 318 and an outer drum and clutch plates 311. The reaction brakes $3B_1$, $3B_4$ and $3B_R$ respectively comprises hubs and clutch plates 73, 71 and 315 and outer clutch plates plates in each case engage a member secured to the casing. Each planetary gear train comprises a sun wheel, planet pinions and planet pinion carrier and an internally toothed annulus. The clutches $3C_1$ and $3C_2$ and the reaction brake $3B_4$ are arranged as in FIG. 1. The first member as defined above consists of a sleeve 65 connected to the outer drum 314 of clutch $3C_1$, and the hub 315 of the reaction brake $3B_4$ and the larger such wheel 66 of the planetary gear train. The second member consists of a shaft 67 connected to hub 318 of clutch $3C_2$ and to carrier 68 of the long planet pinions 69 and the short planet pinions 70 and through the carrier to the hub 71 of the reaction brake $B_R$. The third member consists of a sleeve 72 connected to the hub 73 of the reaction brake $3B_1$ and to the smaller sun wheel 74 of the planetary gear train. The fourth member consists of the internally toothed annulus 75 connected to the output shaft 76. The larger sun wheel 66 and the annulus 75 both mesh with the long planet pinions 69 and the short planet pinions 70 mesh with the smaller sun wheel 74 and with the long planet pinion 69.

The various transmission ratios are achieved as follows.

First Ratio

The clutch $3C_1$ is engaged to drive the sun wheel 66 causing the planet pinions 69 to rotate in the reverse direction and the planet pinions 70 to rotate in the forward direction and roll round the sun wheel 74 which is held stationary by the reaction brake $3B_1$, driving the planet pinion carrier 68 in the forward direction at reduced speed. The reverse rotation of the planet pinions 69 relative to their carrier 68 causes the annulus 75 and the output shaft 76 to rotate in the forward direction at a further reduced speed.

Second Ratio

The clutch $3C_2$ is engaged to drive the planet pinion carrier 68 and the planet pinions 70 roll round the sun wheel 74 which is held stationary by the reaction brake $3B_1$, causing the planet pinions 69 to rotate in the reverse direction relative to their carrier 68, thus causing the annulus 75 and the output shaft 76 to rotate forwards at reduced speed.

Third Ratio

The clutch $3C_2$ is engaged to drive the planet pinion carrier 68 driving both the sun wheel 66 and the annulus 75 forward, but the clutch $3C_1$ is also engaged, constraining the sun wheel 66 to rotate at the speed of the input shaft. The planet pinions 69 and 70 cannot rotate about their own axes and the gear train rotates as a unit providing a 1:1 ratio. The clutch $3C_2$ transmits a torque higher than the input torque and the clutch $3C_1$ returns the excess torque to the input shaft.

Fourth Ratio

The clutch $3C_2$ is engaged to drive the planet pinion carrier 68. The planet pinions 69 roll round the sun wheel 66 which is held stationary by the reaction brake $3B_4$, causing the annulus 75 and the output shaft 76 to rotate forward at increased speed. The planet pinions 69 also rotate the planet pinions 70 and the sun wheel 74 without transmitting any power.

Reverse Ratio

The reaction brake $3B_R$ holds the planet pinion carrier 68 stationary. The clutch $C_1$ drives the sun wheel 66 forwards, the planet pinion 69 rearwards, and the annulus 75 together with the output shaft 76 rearwards at reduced speed.

Figure 4:
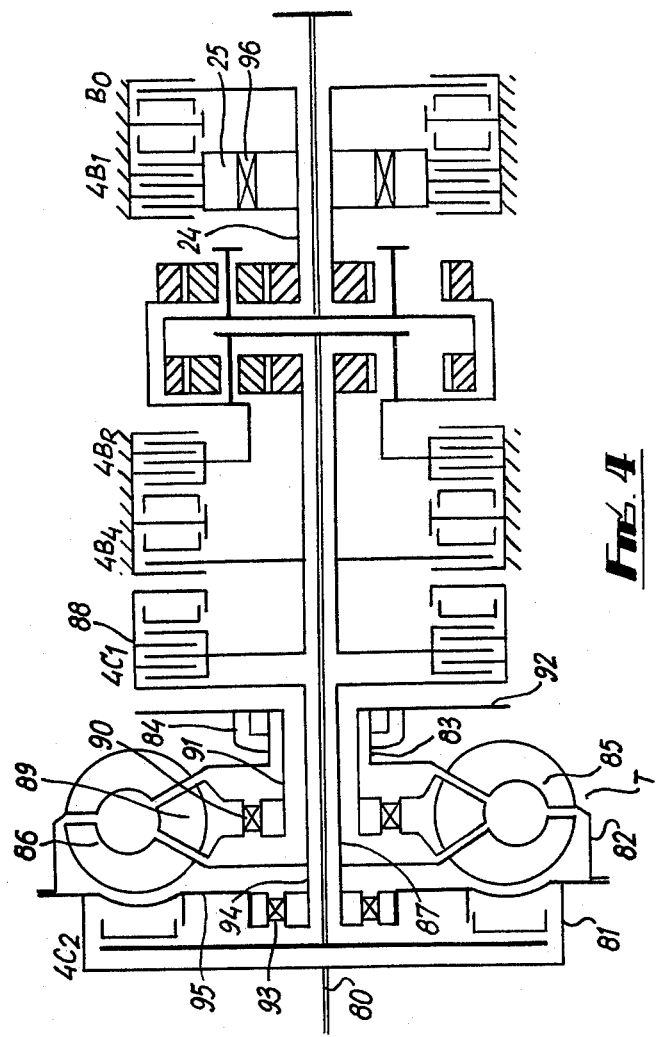
FIG. 4 shows a preferred transmission arrangement with a torque converter for an automobile having a conventional front engine rear wheel drive layout.

FIG. 4 shows the preferred arrangement of a transmission for a conventional vehicle with an engine at the front and rear wheel drive. The arrangement is as shown in FIG. 1 except that the clutch $4C_2$ is driven directly by the engine and the clutch $4C_1$ through a conventional torque converter T comprising impellor 85, turbine 86, stator 89 and housing 82. The engine crankshaft 80 drives outer drum 81 of the clutch $4C_2$ to which the converter housing 82 is attached. The housing 82 has a rearward extension 83 driving an oil pump 84 which supplies oil under pressure to apply the clutches and reaction brakes to keep the converter full and for lubrication. The converter impellor 85 is attached to housing 82. The converter turbine 86 is mounted on a sleeve 87 which carries the outer drum 88 of the clutch $4C_1$. The converter station 89 is connected through a one way clutch 90 to the stationary sleeve 91 which is attached to the wall 92 of the transmission casing.

In the direct drive third ratio the clutches $4C_1$ and $4C_2$ are both applied. The clutch $4C_2$ transmits a higher torque than the engine is delivering and the clutch $4C_1$ transmits torque from the gearbox back to the converter turbine 86, which therefore runs faster than the impeller 85, resulting in a power loss. This loss is considerably smaller than the converter power loss in a conventional automatic transmission because the torque transmitted is considerably smaller, and it may be eliminated completely by the addition of a one-way clutch 93 connecting an extension 94 of the sleeve 87 to the wall 95 of the converter housing 82. This one-way clutch prevents the speed of the turbine 86 from exceeding the speed of the impeller 85 but permits normal functioning of the converter, during which the turbine speed is always lower than the impeller speed.

In order to simplify the achievement of smooth gear shifts the reaction brake $4B_1$, or the equivalent in any of the other possible configurations, may be provided with the well-known device illustrated in FIG. 4. The hub 25 may be connected to a sleeve 24 through a one-way clutch 96 which permits the sleeve 24 to rotate forwards and an additional brake $B_O$ may be provided to prevent this forward rotation when overrun braking is required in First and Second ratio.

Table 1 shows the clutches and brakes engaged for each ratio and two examples of possible sets of ratios. Example 1 shows the ratios obtained from the configuration shown in FIGS. 1 and 4 if annuli 22 and 28 have 2½ times as many teeth as their respective sun wheels 23 and 16. Example 2 shows the ratios obtained if the annuli have twice as many teeth as the sun wheels.

TABLE 1

| Ratio | Clutches Engaged | Brakes Engaged | Example 1 | Example 2 |
|---|---|---|---|---|
| Fourth | $C_2$ | $B_4$ | .714:1 | .667:1 |
| Third | $C_2$, $C_1$ | — | 1:1 | 1:1 |
| Second | $C_2$ | $B_1$ | 1.40:1 | 1.50:1 |
| First | $C_1$ | $B_1$ | 2.40:1 | 2.50:1 |
| Reverse | $C_1$ | $B_R$ | 2.50:1 | 2.00:1 |

It will be appreciated that the above embodiments have been described by way of example only and that many variations are possible without departing from the scope of the invention as defined by the appended claims. For example, any or all of the reaction brakes might comprise a drum in place in the hub and a brake secured to the casing, this brake being either an external contracting band, an internal expanding shoe or a conical brake applied axially.

What is claimed is:

1. A transmission comprising:

an input means;

an output means;

planetary gearing means disposed between said input means and said output means for providing one reverse speed ratio and four forward speed ratios with the fourth forward speed ratio being an overdrive ratio;

said planetary gearing means being operatively associated with a first friction clutch and a second friction clutch and first, second and third reaction brakes and first, second, third and fourth members;

a hydrodynamic torque converter operatively associated with said planetary gearing means and through which drive from said input means to said output means is provided in reverse speed ratio and first speed ratio only, said hydrodynamic torque converter being drivably connected to said first friction clutch and being arranged to be driven from said input means and drivably connected to said second friction clutch which is driven directly and mechanically from said input means, said hydrodynamic torque converter including an impeller, a stator and a turbine;

a one-way clutch provided between said impeller and said turbine to prevent said turbine from rotating at a higher forward speed than said impeller to eliminate power loss in the third speed ratio;

said first member being arranged to be driven from said input means through said fluid coupling and said first clutch in reverse speed ratio, first speed ratio and third speed ratio;

said second member being arranged to be driven directly from said input means in said second speed ratio and said third speed ratio and held stationary through said first reaction brake in reverse speed ratio;

said third member being arranged to be held stationary through said second reaction brake in said first speed ratio and said second speed ratio;

said fourth member being permanently connected to said output means; and said third reaction brake being provided to operatively hold said first member stationary to provide said fourth speed ratio from said planetary gearing means and said second member being driven through said second friction clutch in said fourth speed ratio.

2. A transmission as claimed in claim 1, in which a one-way clutch is provided to permit forward rotation of the third member of the planetary gearing when the second reaction brake is engaged and an additional friction reaction brake is provided which may be engaged when required to prevent such forward rotation.

* * * * *